Patented May 22, 1928.

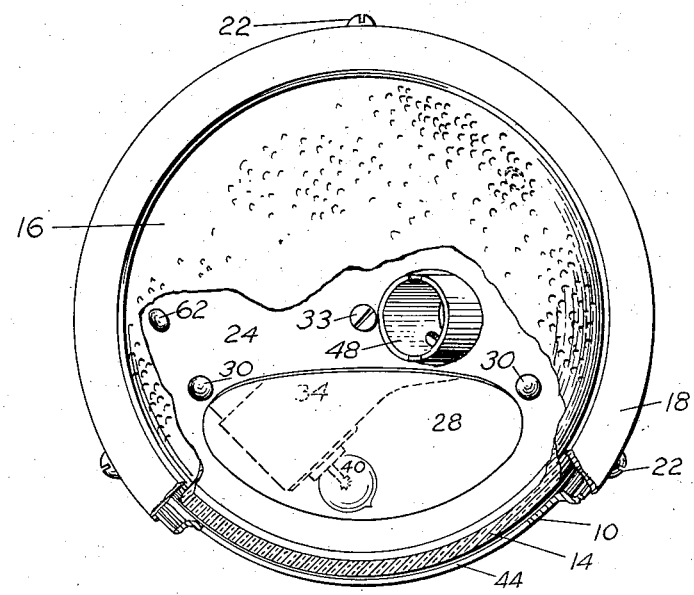
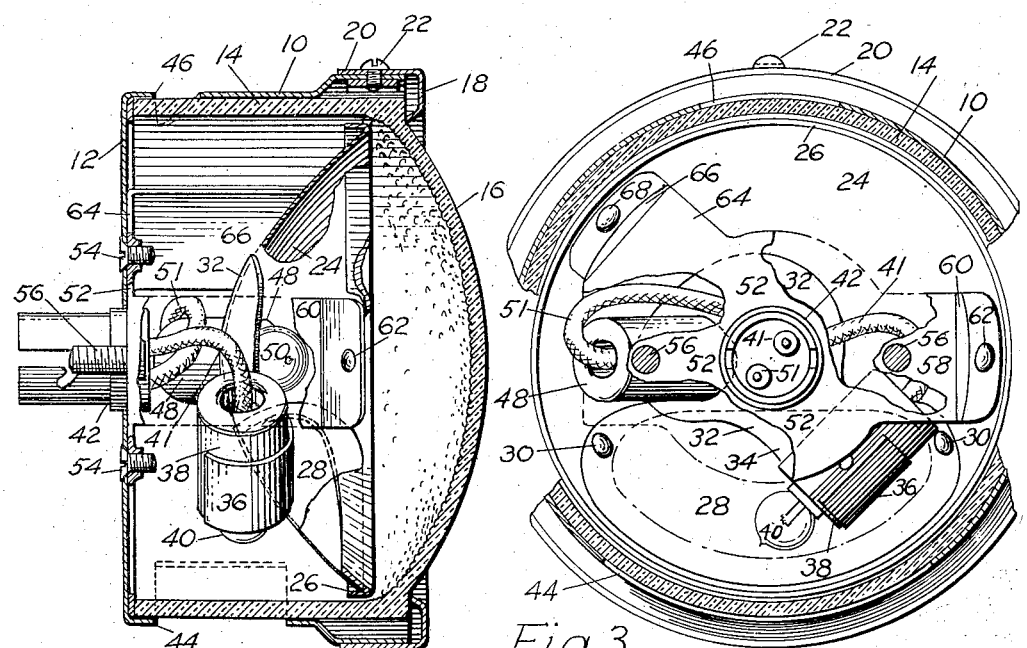

1,671,024

UNITED STATES PATENT OFFICE.

HARRY C. FOSTER, OF CONNERSVILLE, INDIANA, ASSIGNOR, BY DIRECT AND MESNE ASSIGNMENTS, OF ONE-HALF TO INDIANA LAMP CORPORATION, OF CONNERSVILLE, INDIANA, A CORPORATION OF DELAWARE, AND ONE-HALF TO GENERAL MOTORS CORPORATION, OF DETROIT, MICHIGAN, A CORPORATION OF DELAWARE.

LAMP STRUCTURE.

Application filed January 21, 1925. Serial No. 3,792.

This invention relates to lamp structure and is herein shown as embodied in a combined tail, backing, and stop light for motor vehicles.

It has been the practice to provide automobiles with a tail light, and sometimes with a separate stop light operated by the brake to warn a vehicle in the rear when the preceding vehicle is about to stop or slacken its speed. When an automobile is backing at night, the only illumination available for the road behind is that furnished by the tail light which is of low candle power and has its intensity decreased by a red glass or the like. Stop lights are also obscured by colored glass and are not available when the brake is off. When backing, the tail light is insufficient for the safety of either the vehicle or of pedestrains.

One of the objects of the invention, therefore, is to provide an efficient backing light, preferably combined in a single structure with the tail light. Another object is to provide a lamp structure which will serve as either a tail light, a backing light, or a warning stop light.

To these ends and also to improve generally upon devices of the character indicated, my invention consists in the various matters hereinafter described and claimed.

In the drawings, Figure 1 is a front elevation of the improved lamp, partly broken away and in section.

Figure 2 is principally a vertical longitudinal section with parts broken away and Figure 3 is a transverse section with parts broken away.

The numeral 10 indicates a lamp casing having a rear wall 12, the direction in which light is projected being considered the front. A cup-shaped transparency or lens having a cylindrical side wall 14 is enclosed in the lamp casing, the front wall 16 of the glass preferably being provided on the inside with a multitude of little nodules to diffuse the light. The glass is retained by a ring 18 abutting against a shoulder on the glass and having a flange 20 enclosing the rim of the lamp casing to which it is fastened by screws 22.

A reflector 24, having a peripheral flange 26, is housed within the glass and casing. A portion of the reflector is cut away, preferably below the axis, and a section of colored, translucent material 28, such as red pyralin or red glass, is fastened at 30 to the reflector over the opening. A lamp carrying bracket plate 32 is secured by a screw 33 to the rear face of the reflector at the center. The plate has a downwardly and laterally extending arm 34 which is rolled into a sleeve portion 36 adapted to hold a lamp socket 38. A lamp 40, of comparatively low candle power, is inserted in the socket in a position to shine forwardly through the translucent material 28. The material being colored red imparts a red glow to the light which serves as a tail or parking light. A flexible conductor 41 connects the lamp 40 with a contact point in a socket 42 which passes through a central opening in the rear wall 12 of the casing and receives the usual plug from the source of lighting current.

The lamp casing 10 is provided with opposite, cut-out portions 44 and 46, the former allowing light from the tail lamp to pass through the glass wall 14 to illuminate the usual license plate and the latter allowing light to pass up to an automobile name plate mounted above the lamp. The plate 32 is extended to the side of the casing opposite the arm 34 and carries a socket 48 which is inclined relatively to the reflector axis and passes through a hole to the front of the reflector. A lamp 50 of comparatively high candle power is inserted in the socket and its filament is positioned approximately at the focus of the reflector. This lamp serves as a backing lamp, the rays of light being directed by the reflector to the road behind the vehicle. A flexible conductor 51 connects the lamp with a plug in the plug socket 42. The lamp may be lighted by a switch on the instrument board or the circuit may be closed by the act of throwing the gear shift lever into reverse, preparatory to backing. As this light also serves as a warning stop light, it may be placed in a circuit which is closed either by the act of applying the brakes or by the act of placing the gear shift lever into reverse. The front wall 16 of the glass may have the word "Stop" or "Slow" printed or cast therein.

The reflector is secured to the casing in any suitable way. As shown, a two-armed saddle 52 has its central substantially circular portion secured to the inner face of the rear wall 12 by upper and lower screws 54 and by side bolts 56, the latter also serving to attach the lamp to a bracket on the vehicle. One arm 58 of the saddle 52 is extended to one side and then forwardly at 60 where its front end is fastened by a rivet 62 to the reflector. The other arm 64 is inclined upwardly and to the other side and is then carried forwardly at 66 where its front end is secured by a rivet 68 to the reflector.

Inasmuch as the lower part of a parabolic reflector reflects a large part of those stray rays which produce glare, the cut-out portion, either with or without a colored or translucent section 28, would eliminate such glare and this feature is therefore adapted for headlight use.

Altho the invention has been described by reference to a specific construction, it should be understood that, in its broader aspects, it is not necessarily limited to the form selected for mere illustrative purposes.

I claim:

In a device of the character described, a cylindrical lamp casing having an open end and formed with an aperture near the closed end thereof, a cup-shaped transparent lining nested within said casing, the closed end thereof forming a clear lens for the open end of said casing, a partition wall dividing said casing into two compartments, consisting of a reflector supported by the rear wall of the casing in spaced relation with the outer walls thereof, and a color screen carried thereby, separate differential light sources in each compartment, one of said lights being adapted to transmit rays through the aperture near the closed end of the casing, and through the color screen and lens, and the other light being adapted for intermittent use to project uncolored rays through the clear lens.

In testimony whereof I affix my signature.

HARRY C. FOSTER.